Figure 3:
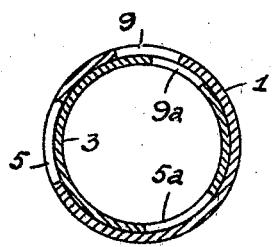

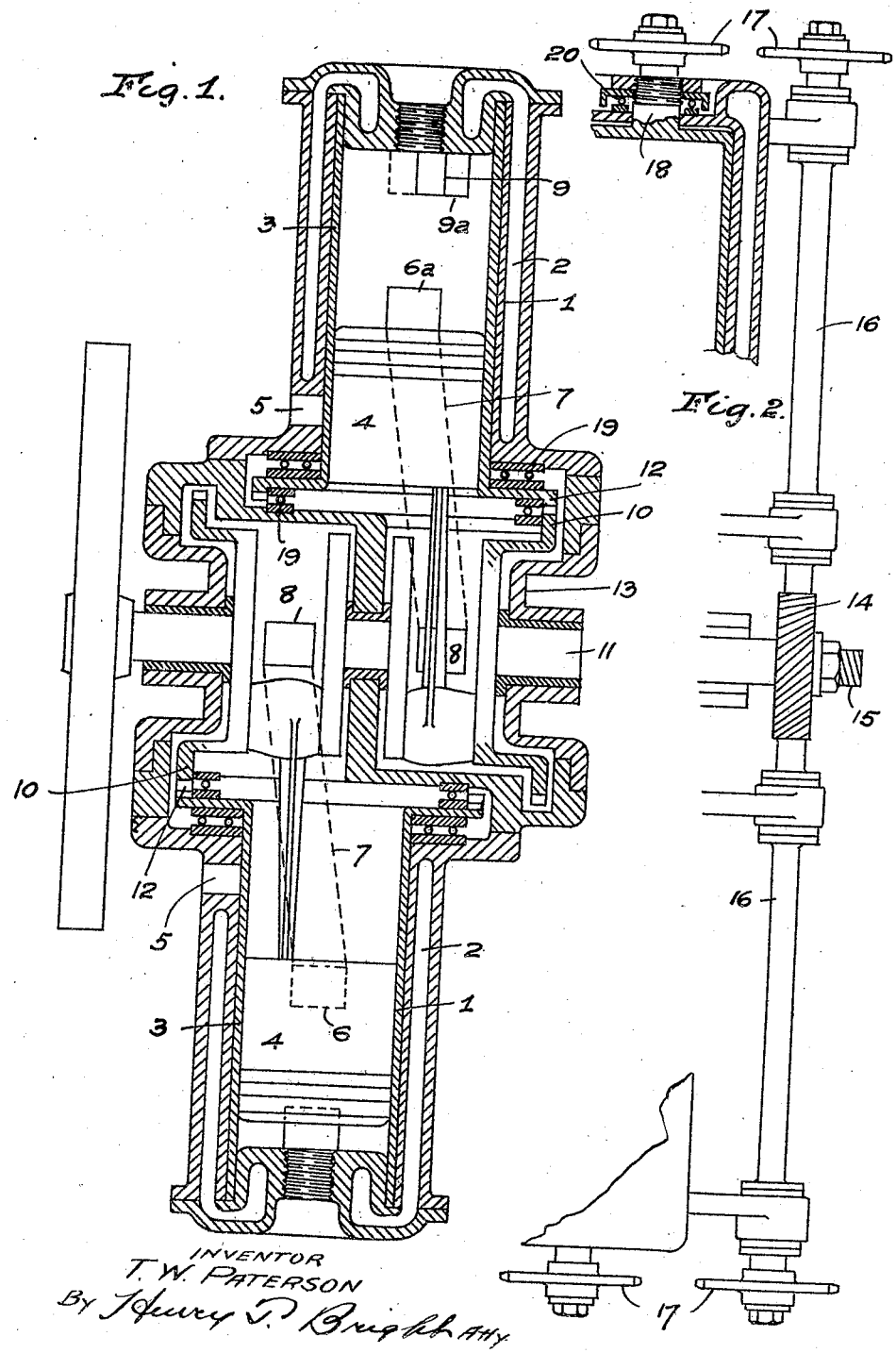

Patented Jan. 2, 1923.

UNITED STATES PATENT OFFICE.

THOMAS WATSON PATERSON, OF LIVERPOOL, ENGLAND.

ROTARY SLEEVE-VALVED TWO-CYCLE ENGINE.

Application filed March 25, 1920. Serial No. 368,709.

*To all whom it may concern:*

Be it known that I, THOMAS WATSON PATERSON, a subject of the King of Great Britain, and a resident of Liverpool, England, have invented certain new and useful Improvements in Rotary Sleeve-Valved Two-Cycle Engines, of which the following is a specification.

This invention relates to a two-stroke cycle internal combustion engine having a rotary sleeve valve. In two-stroke cycle engines in order to enable the exhaust gases to be effectively swept from the cylinder, the inlet should be disposed at one end and the exhaust at the other. As such an arrangement, however, would in the usual type of engine in which the piston operates as a valve necessitate one of the valves being continually open the inlet and exhaust ports have been disposed in the further part of the cylinder uncovered by the piston on its outward stroke. Such an arrangement, however, is ineffective inasmuch as the spent gases are not swept out and a great portion of the incoming combustible mixture passes out with the exhaust, and to avoid this means have been provided such as an upstanding web or rib on the piston which acted to deflect the incoming combustible mixture well into the head of the cylinder, the spent gases being thus swept out therefrom. Such an arrangement is, however, very disadvantageous. Also, where compression of the combustible mixture is effected in the crank case the inlet port for the combustible mixture to the crank case is disposed as high as possible in the cylinder wall and in consequence such port is only uncovered momentarily by the piston. The object of the present invention is to overcome these difficulties in a two-stroke cycle engine by positively controlling, otherwise than solely by the piston, the inlet of the combustible mixture to the crank case and into and from the firing space of the cylinder by means of a rotary sleeve valve. The invention may be adapted for a twin opposed cylinder unit engine.

According to this invention, therefore, the cylinder of the engine is provided with a rotary sleeve valve having three ports co-operating respectively with three other ports in the cylinder wall. The piston works within the sleeve valve and fits gastightly therein. The inlet port from the carburetter to the crank case is disposed comparatively low down in the cylinder and sleeve valve, so that this port may be uncovered immediately the piston begins to rise on its inward stroke and thus the maximum suction effect of the piston in drawing in a charge from the carburetter is taken advantage of. The inlet port to the firing space from the crank case, is disposed at the lowest point of the cylinder uncovered by the top of the piston on its outward stroke, and the exhaust ports are disposed near the top of the sleeve valve and cylinder.

Figure 5:
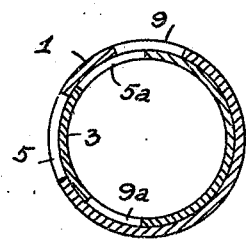
Figure 4:
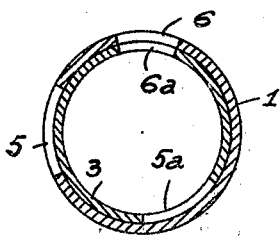
Figure 6:
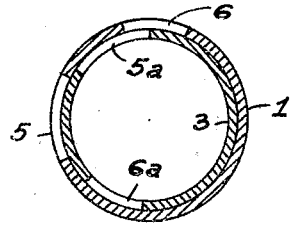

The invention is illustrated in the accompanying drawings in which Fig. 1. is a longitudinal section showing the invention applied to an engine, comprising two opposed cylinders on opposite sides of the crank shaft, the sleeve valves being driven by mechanism enclosed in the crank case. Fig. 2. is a fragmentary section showing a modified drive for the sleeve valves, the driving gear being exterior to the crank case and cylinders, Fig. 3. is a diagrammatic section showing the relative positions of the exhaust ports in the sleeve and cylinder and the carburetter ports when the piston is on the bottom dead centre, while Fig. 4. is an analogous section showing the position of the inlet ports to the cylinder from the crank case when the piston is in the same position. Fig. 5. shows the position of the exhaust ports and carburetter ports when the piston is on the top dead centre, and Fig. 6. shows the position of the inlet ports from the crank case when the piston is in the same position.

In carrying out the invention, the cylinders 1 of the engine, which may be water-jacketed at 2 in any usual manner, are provided with rotary sleeve valves 3, each having three ports co-operating with three other ports in the cylinder wall. The pistons 4 work gastightly in the sleeve valves. The cylinder inlet port 5 from the carburetter to the crank case is disposed low down in the cylinder as is the corresponding port 5ª in the sleeve valve, so that this carburetter port may be uncovered immediately the piston begins to rise on the suction stroke and thus the maximum suction effect of the piston to draw in a charge from the carburetter is taken advantage of. The cylinder inlet port 6 to the firing space of the cylinder communicates by way of suitable ducts 7 with corresponding ports 8 in the crank case and such inlet ports 6 and the corresponding sleeve ports 6ᵃ are disposed at the lowest part uncovered by the piston 4 on its outward stroke, as shown in the top cylinder of Fig. 1, the exhaust ports 9 in the cylinder and 9ᵃ in the sleeve valve being disposed near the top.

In operation, therefore, supposing the piston to be retreating into the cylinder head the rotation of the sleeve valve is about to uncover the carburetter port 5 to the crank case as the piston begins to uncover the corresponding port 5ᵃ in the sleeve, and in this way full advantage may be taken of the entire suction stroke of the piston. On the return or outward stroke of the piston the combustible mixture is compressed and passed from the crank case through the inlet ports 6, 6ᵃ, in the cylinder and sleeve valve to the firing space of the cylinder, assisting in sweeping out the exhaust gases through the upper open exhaust ports 9, 9ᵃ, in the cylinder and sleeve valve. Owing to the combined opening movement of the ports with such an arrangement, due to the rotational movement of the sleeve valve and the longitudinal covering and uncovering movement of the piston, the inlet port from the crank case 6 to the cylinder may be opened and closed very quickly, a full charge of the combustible mixture being permitted to enter the firing cylinder when the piston is on the outer part of its stroke, and for the same reason the exhaust port may be made to close quickly as the piston commences its inward compression stroke and thus prevent any great portion of the fresh charge being entrained with the spent gases out through the exhaust.

Such an arrangement of two-stroke cycle engine may be adapted for use where two cylinders are arranged on opposite sides of the crank shaft as in the form illustrated, the cylinders being thus in twin opposed formation. In this construction, each sleeve valve may be rotated from a helical or other gear wheel 10 on the crank shaft 11 engaging a helical or other gear 12 on the lower edge of the sleeve valve, the valve operating gear being thus entirely enclosed in the crank case 13, or if desired, the sleeve valve may be driven from an exterior mechanism such as from helical or other gear 14 on the crank shaft engaging helical or other gear 15 on a side shaft 16, Fig. 2, the ends of the side shaft being coupled by chain and sprocket gear 17 to a stub spindle 18 on the sleeve valve passing through the cylinder heads, or the sleeves may be driven otherwise. The sleeve valves at their lower ends and also in the region of the stub driving spindles are fitted with ball races 19, 20, which take the longitudinal thrust due to the drag of the piston.

In such an arrangement the sleeve valve and the cylinder being each provided with three ports, the co-operation of these ports to effect the entrance of the combustible mixture to the crank case for compression, from the crank case to the firing cylinder, and from the cylinder to the exhaust may be very effectively attained, and inasmuch as the opening and closing of these ports is not merely dependent upon the longitudinal movement of the piston but is controlled by the combined longitudinal movement of the piston and the rotary movement of the sleeve valve, by making the size of the ports as required any desired period of opening of these valves may be secured, and a much more effective type of engine obtained than is possible with other arrangements where rotary sleeve valves are not fitted.

I claim:

An internal combustion engine including a base, a cylinder, a sleeve valve rotatable within said cylinder, a piston slidable within said sleeve valve, a by-pass communicating between the base and the interior of the sleeve valve, a fuel inlet port in said cylinder and a similar port in the sleeve valve, said ports when alined providing communication independent of said by-pass and directly between a source of fuel supply and said base, means for exhausting products of combustion from said sleeve valve, and means for rotating said valve.

In testimony whereof I affix my signature in presence of two witnesses.

THOMAS WATSON PATERSON.

Witnesses:
A. J. DAVIES,
E. HEGINBOTHAM.